United States Patent
Yamamoto

(10) Patent No.: US 8,760,870 B2
(45) Date of Patent: Jun. 24, 2014

(54) PLUGGABLE MODULE AND METHOD OF INSERTING ELECTRONIC MODULE

(75) Inventor: Naoki Yamamoto, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 164 days.

(21) Appl. No.: 13/426,062

(22) Filed: Mar. 21, 2012

(65) Prior Publication Data

US 2012/0300407 A1 Nov. 29, 2012

(30) Foreign Application Priority Data

May 25, 2011 (JP) ................................. 2011-117075

(51) Int. Cl.
*H05K 7/20* (2006.01)

(52) U.S. Cl.
USPC ...... 361/710; 361/679.54; 361/715; 361/727; 361/728; 361/756; 174/548; 312/223.2; 165/80.2; 165/80.3

(58) Field of Classification Search
USPC .............. 361/679.46–679.54, 688–722, 752, 361/756, 831
See application file for complete search history.

(56) References Cited

U.S. PATENT DOCUMENTS

| | | | |
|---|---|---|---|
| 6,942,506 B2 * | 9/2005 | Kimura et al. | 439/159 |
| 7,448,921 B2 * | 11/2008 | Kim et al. | 439/744 |
| 7,491,090 B2 * | 2/2009 | Oki et al. | 439/607.17 |
| 7,518,870 B2 * | 4/2009 | Choi et al. | 361/702 |
| 8,081,470 B2 * | 12/2011 | Oki et al. | 361/715 |
| 2004/0226689 A1 * | 11/2004 | Thompson et al. | 165/80.2 |
| 2007/0050125 A1 | 3/2007 | Matsuda et al. | |
| 2009/0296350 A1 | 12/2009 | Oki et al. | |
| 2009/0296351 A1 * | 12/2009 | Oki et al. | 361/709 |
| 2010/0067196 A1 * | 3/2010 | Costello et al. | 361/704 |

FOREIGN PATENT DOCUMENTS

| | | |
|---|---|---|
| JP | 11-121959 | 4/1999 |
| JP | 2007-92748 | 4/2007 |
| JP | 2009-152427 | 7/2009 |
| JP | 2009-152428 | 7/2009 |

* cited by examiner

*Primary Examiner* — Courtney Smith
(74) *Attorney, Agent, or Firm* — Staas & Halsey LLP

(57) ABSTRACT

A pluggable module, includes: an insertion gate through which an electronic module is inserted and removed; a guide rail, including a spring support unit provided with a spring unit and a bearing unit located near the insertion gate, to guide the electronic module; and a heat sink plate, including, at one end portion, a fulcrum bar to be inserted into the bearing unit so as to move in a pressing direction of the spring unit, the heat sink plate being pushed up at the other end portion by a leading end of the electronic module so as to be pressed against the electronic module.

12 Claims, 12 Drawing Sheets

PLUGGABLE MODULE AND METHOD OF INSERTING ELECTRONIC MODULE

CROSS-REFERENCE TO RELATED APPLICATION(S)

This application is based upon and claims the benefit of priority of the prior Japanese Patent Application No. 2011-117075, filed on May 25, 2011, the entire contents of which are incorporated herein by reference.

FIELD

The embodiment discussed herein is related to a pluggable module.

BACKGROUND

Some optical modules having an optical transceiver function includes pluggable modules that is removably inserted. Outer dimensions or the forms of electrical connections of such pluggable modules are standardized, and different specifications such as transmission and reception functions, transmission rates, or optical wavelengths of module components are offered as selectable specifications.

For example, when Small Form-factor Pluggable (SFP) modules performing 2.5 Gbps optical communication, 10 Gbps Small Form-factor Pluggable (XFP) modules performing 10 Gbps optical communication, or the like are used, specifications or transmission capacity of an optical transmission device may be easily changed by adding or removing module components to be housed.

Related art is disclosed in Japanese Laid-open Patent Publication No. 2009-152427 and the like.

SUMMARY

According to one aspect of the embodiments, a pluggable module, includes: an insertion gate through which an electronic module is inserted and removed; a guide rail, including a spring support unit provided with a spring unit and a bearing unit located near the insertion gate, to guide the electronic module; and a heat sink plate, including, at one end portion, a fulcrum bar to be inserted into the bearing unit so as to move in a pressing direction of the spring unit, the heat sink plate being pushed up at the other end portion by a leading end of the electronic module so as to be pressed against the electronic module.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

When pluggable modules are used at transmission rates from 10 Mbps, 100 Mbps, 1 Gbps (for 10BASE, 100BASE, and 1000BASE networks, respectively) to 10 Gbps, the power consumption of each pluggable module ranges from about 1 W to 3 W and heat generated by the pluggable module may be small.

In a pluggable module such as a 100 G Form-factor Pluggable (CFP) module, which supports a transmission rate of 100 Gbps, the power consumption may exceed 20 W and heat generated by a module component may become larger. For this reason, a heat sink structure may be provided for the pluggable module.

In the heat sink structure for the pluggable module, the module component is inserted or removed while a heat sink plate is uniformly pressed. Thus, the module component or the heat sink plate may wear out because of sliding contact.

Figure 1:
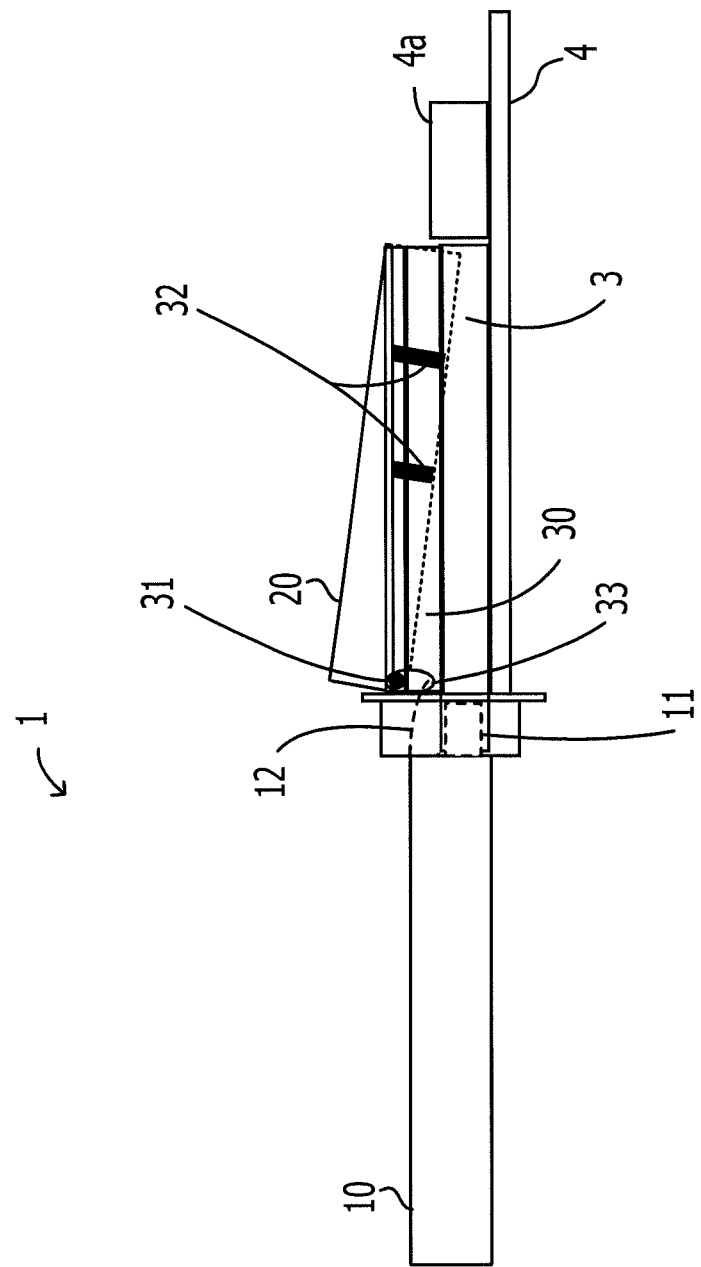
FIG. 1 illustrates an exemplary pluggable module.
Figure 2:
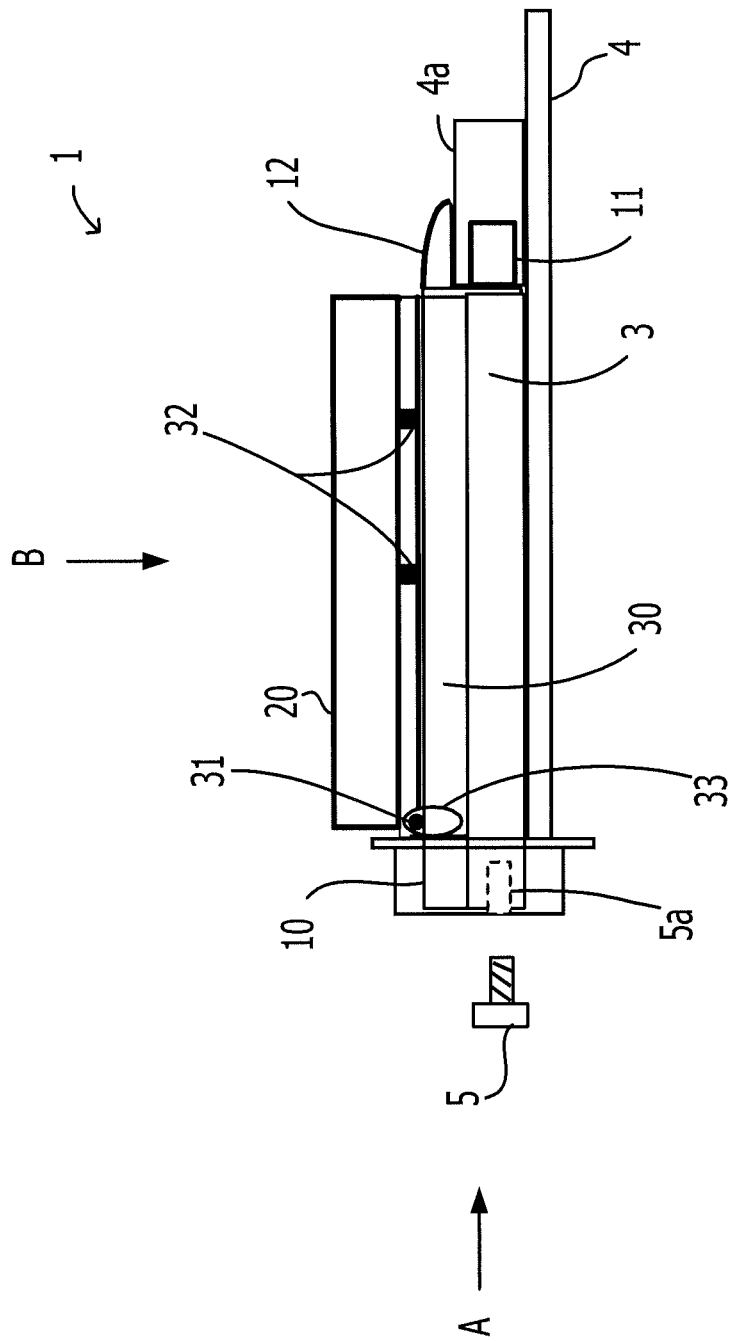
FIG. 2 illustrates an exemplary pluggable module.

FIGS. 1 and 2 illustrate an exemplary pluggable module. FIG. 1 illustrates a state of the pluggable module into which an electronic module is not inserted, for example, a state before the electronic module has been inserted or a state when the electronic module has been removed. FIG. 2 illustrates the pluggable module into which the electronic module has been inserted.

A pluggable module 1 includes an electronic module 10, a heat sink plate 20, and guide rails 3. The pluggable module 1 may be a pluggable type module that is insertable and removable using a plug. The heat sink plate 20 may be, for example, a plate-shaped metal (fin). The heat sink plate 20 is in contact with the electronic module 10 to dissipate heat. The heat sink plate 20 is referred to as a heat sink fin 20 hereafter.

The electronic module 10 includes a variety of electronic components (not illustrated) to perform communication. For example, the electronic module 10 may include electronic components such as a component capable of optical transmission and reception. At a leading end of the electronic module 10, a module connector 11 and a connector protection member 12 (referred to as a connector protection cover 12 hereafter) are provided.

The guide rails 3 are mounted on a printed circuit board 4. The electronic module 10 is removably mounted on the printed circuit board 4. The electronic module 10 is guided along the guide rails 3 to be inserted or removed in a sliding manner.

The printed circuit board 4 includes a connector socket 4a, which is engaged with the module connector 11 when the electronic module 10 is coupled to the printed circuit board 4 by connector connection.

When the electronic module 10 is coupled to the printed circuit board 4 by connector connection, the guide rails 3 is fixed to the electronic module 10 with screws 5 via holes for a screw 5a formed in an insertion gate of the guide rails 3.

The connector protection cover 12, which is provided above the module connector 11, reduces exposure of connector pins of the module connector 11. This may reduce a possibility of the module connector 11 being contacted by the heat sink fin 20 or the like, and accordingly, damage to the electronic module 10 may be decreased during insertion or removal of the electronic module 10.

A spring support units 30 are provided in an upper part of the guide rails 3. Each spring support unit 30 is provided with spring units 32, which cause the heat sink fin 20 to move. A fulcrum bar 31 is integrally molded with the heat sink fin 20, or provided in the heat sink fin 20 as a separately molded unit. The fulcrum bar 31 is coupled to one end portion of the heat sink fin 20, for example, an end portion on the electronic module 10 insertion side. Each end of the fulcrum bar 31 is fitted into a bearing unit 33, which is provided on a side surface of each spring support unit 30 and located near the insertion gate for the electronic module 10.

When the electronic module 10 is not inserted, the other end portion (rear end portion) side of the heat sink fin 20 moves down on the axis of the fulcrum bar 31 owing to downward pressure caused by the spring forces of the spring units 32. As illustrated in FIG. 1, the heat sink fin 20 is set with the rear end portion moved down.

When the electronic module 10 is inserted, the rear end portion of the heat sink fin 20 is pushed up on the axis of the fulcrum bar 31 by the leading end of the electronic module 10, for example, the connector protection cover 12. When the electronic module 10 is coupled by connector connection and housed, as illustrated in FIG. 2, the heat sink fin 20 is pressed against the housed electronic module 10 owing to pressure applied by the spring units 32.

Figure 3:
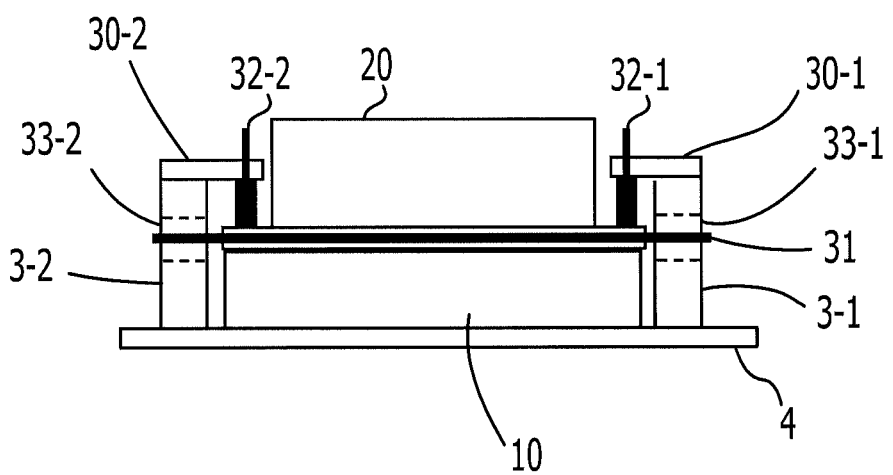
FIG. 3 illustrates an exemplary pluggable module.

FIG. 3 illustrates an exemplary pluggable module. FIG. 3 may be a view of the pluggable module illustrated in FIG. 2 seen from the side of the insertion gate for the electronic module 10, for example, seen in an arrow III direction indicated in FIG. 2. Illustration of the screws 5 may be omitted. Guide rails 3-1 and 3-2 are mounted on one and the other sides of the printed circuit board 4. A spring support unit 30-1 is provided in an upper portion of the guide rail 3-1. A spring support unit 30-2 is provided in an upper portion of the guide rail 3-2.

A bearing unit 33-1 is provided in a side surface of the spring support unit 30-1. A bearing unit 33-2 is provided in a side surface of the spring support unit 30-2. One and the other ends of the fulcrum bar 31 coupled to the fulcrum bar 31 are fitted into the bearing units 33-1 and 33-2.

The spring support unit 30-1 is provided with a spring unit 32-1. The spring support unit 30-2 is provided with a spring unit 32-2. One end of the spring unit 32-1 is attached to the spring support unit 30-1. The other end of the spring unit 32-1 contacts the heat sink fin 20 at a position where the spring unit 32-1 applies a spring force to the heat sink fin 20. For example, the other end of the spring unit 32-1 is coupled to one lateral end side of the heat sink fin 20.

One end of the spring unit 32-2 is attached to the spring support unit 30-2. The other end of the spring unit 32-2 contacts the heat sink fin 20 at a position where the spring unit 32-2 applies a spring force to the heat sink fin 20. For example, the other end of the spring unit 32-2 is coupled to the other lateral end side of the heat sink fin 20.

Figure 4:
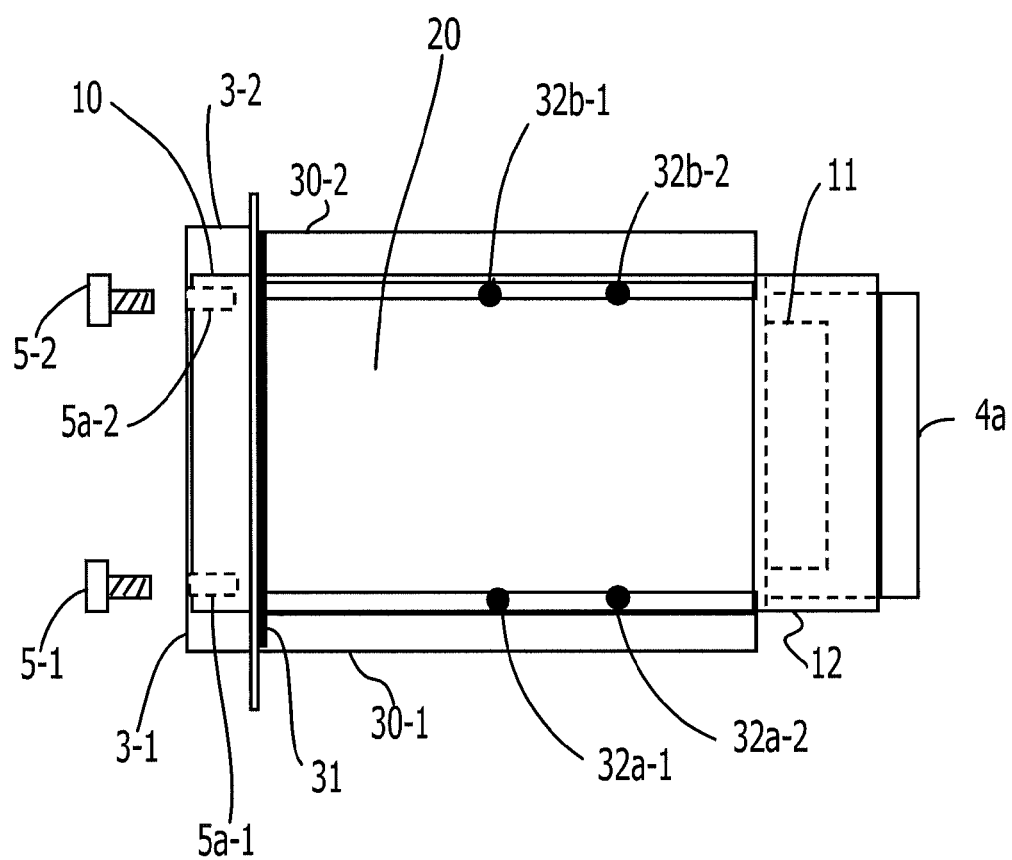
FIG. 4 illustrates an exemplary pluggable module.

FIG. 4 illustrates an exemplary pluggable module. FIG. 4 may be a view of the pluggable module illustrated in FIG. 2 seen from the side above the heat sink fin 20, for example, seen in an arrow IV direction indicated in FIG. 2. The module connector 11 of the electronic module 10 is engaged with the connector socket 4a.

After the engagement, screws 5-1 and 5-2 are fastened using holes for a screw 5a-1 and 5a-2 respectively formed in the guide rails 3-1 and 3-2, thereby securing the electronic module 10 to the guide rails 3-1 and 3-2 mounted on the printed circuit board 4.

Spring units 32a-1 and 32a-2 are provided in the spring support unit 30-1 in the upper portion of the guide rail 3-1. Spring units 32b-1 and 32b-2 are provided in the spring support unit 30-2 in the upper portion of the guide rail 3-2.

When the electronic module 10 is not inserted, the heat sink fin 20 is set as follows: the rear end portion of the heat sink fin 20 is moved down on the axis of the fulcrum bar 31 owing to downward pressure caused by the spring forces of the spring units 32a-1, 32a-2, 32b-1, and 32b-2.

The moving distance of the spring unit 32a-2 may be greater than that of the spring unit 32a-1. The moving distance of the spring unit 32b-2 may be greater than that of the spring unit 32b-1. The moving distance of the spring units 32a-2 and 32b-2 may correspond to the spring forces of the spring units 32a-2 and 32b-2. The number of the spring units may be provided.

As illustrated in FIGS. 1 and 2, the spring units 32 may be arranged so as to apply pressure to move the heat sink fin 20 downward. The fulcrum bar 31 is provided on the insertion gate of the electronic module 10 side. When the electronic module 10 is not inserted, the heat sink fin 20 is set as follows: the rear end portion of the heat sink fin 20 is diagonally moved down on the axis of the fulcrum bar 31. The fulcrum bar 31 may be fitted into the bearing units 33 and movable through the bearing units 33.

Figure 5:
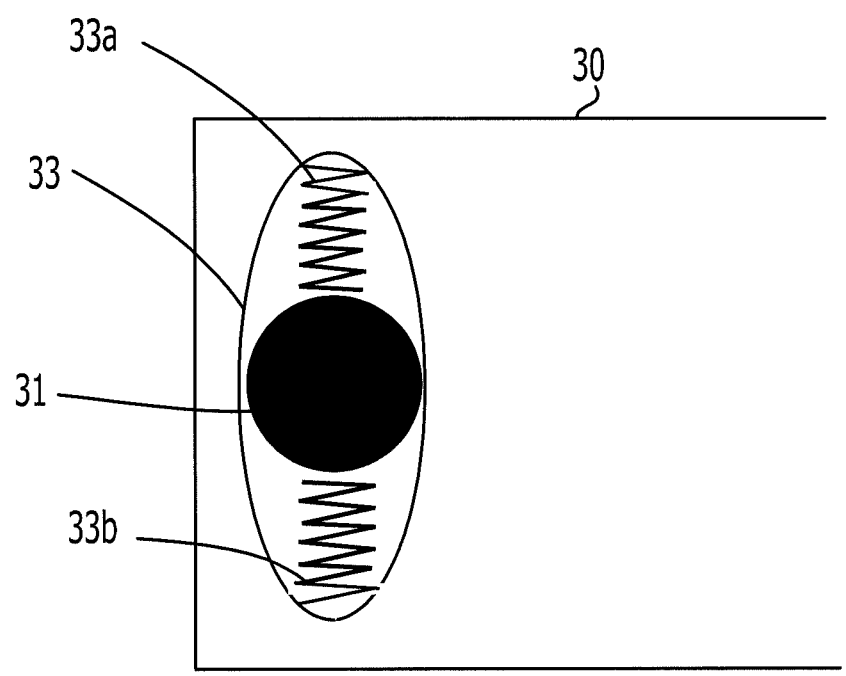
FIG. 5 illustrates an exemplary bearing unit.

FIG. 5 illustrates an exemplary bearing unit. The bearing unit illustrated in FIG. 5 may be the bearing unit 33 illustrated in FIG. 1 or 2. The bearing unit 33 of the fulcrum bar 31 provided in the side of each spring support unit 30 may have an elliptical shape with the major axis of the ellipse extending in the perpendicular direction. In each bearing unit 33, springs 33a and 33b are provided in the major axis direction. The fulcrum bar 31 fitted into the bearing units 33 moves up and down in the major axis direction owing to the spring pressure of the springs 33a and 33b.

The spring units 32 undergo a movement centered at the fulcrum bar 31 between a position at which the heat sink fin 20 is set with the rear end portion of the heat sink fin 20 diagonally moved down and a position at which the heat sink fin 20 is set in a horizontal direction by the insertion of the electronic module 10. The fulcrum bar 31 may move in an up and down direction relative to the elliptically shaped bearing unit 33 owing to the spring pressure of the springs 33a and 33b provided in the major axis direction.

When the electronic module 10 is being inserted, a shift in the position of the inserted electronic module 10 in a height direction, or manufacturing errors of the guide rails 3, for example, manufacturing errors of the spring support units 30, may be absorbed. The movement range of the fulcrum bar 31 in a height direction may be greater than the tolerance range in the design of the height of the electronic module 10 to be inserted.

Figure 6:
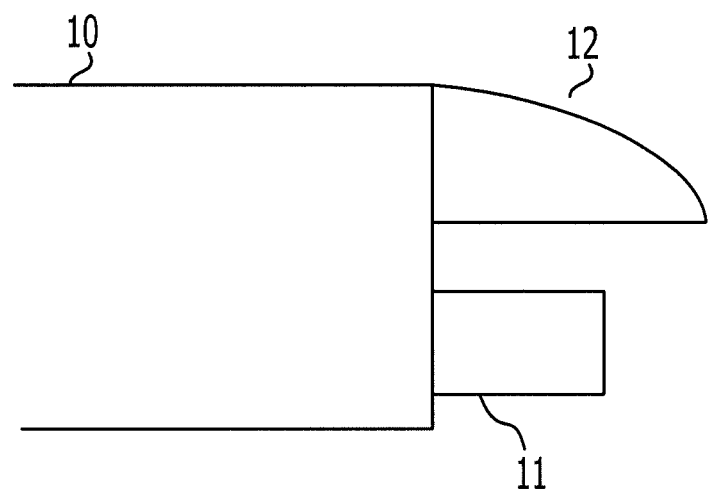
FIG. 6 illustrates an exemplary connector protection cover.

FIG. 6 illustrates an exemplary connector protection cover. The connector protection cover illustrated in FIG. 6 may be the connector protection cover 12 illustrated in FIG. 1 or 2. The connector protection cover 12 is provided above the module connector 11 at a rear end portion of the electronic module 10.

The connector protection cover 12 may reduce exposure of the module connector 11. An upper surface portion of the connector protection cover 12 has a curved shape having a curvature. Thus, a damage and a friction of the heat sink fin 20 and the electronic module 10 may be reduced.

For example, when the electronic module 10 is being inserted, the electronic module 10 pushes up the heat sink fin 20 while smoothly contacting the heat sink fin 20. When the electronic module 10 is being removed, removal of the electronic module 10 sets the heat sink fin 20 in an inclined position in which the rear end portion of the heat sink fin 20 is diagonally lowered while the electronic module 10 smoothly contacts the heat sink fin 20.

Figure 7:
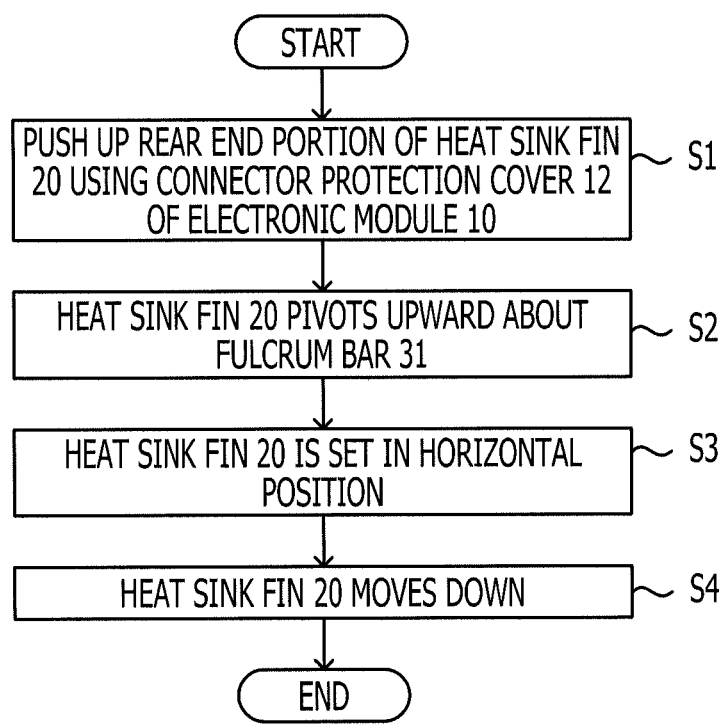
FIG. 7 describes an exemplary operation of a heat sink fin.

FIG. 7 describes an exemplary operation of a heat sink fin.

In an operation S1, when the electronic module 10 is being inserted, the rear end portion of the heat sink fin 20, which is inclined on the axis of the fulcrum bar 31 owing to downward pressure applied by the spring units 32, is pushed up by the connector protection cover 12 attached to the electronic module 10.

In an operation S2, the rear end portion of the heat sink plate 20 is moved up on the axis of the fulcrum bar 31. In an operation S3, the heat sink fin 20 is set in a horizontal position owing to downward pressure applied by the spring units 32 while being pressed against the electronic module 10 being inserted. The module connector 11 of the electronic module 10 is engaged with the connector socket 4a on the printed circuit board 4 while the heat sink fin 20 is pressed against the electronic module 10.

In an operation S4, when the electronic module 10 is being removed, the heat sink fin 20 is set again in a position in which the rear end portion of the heat sink fin 20 is pressed and moved down on the axis of the fulcrum bar 31 by the downward spring forces of the spring units 32.

When the electronic module 10 is not inserted, the heat sink fin 20 is set in a position inclined on the axis of the fulcrum bar 31 downward owing to spring pressure applied by the spring units 32. When the electronic module 10 is inserted, the heat sink fin 20 is pressed against the inserted electronic module 10 owing to pressure applied by the spring units 32, and the electronic module 10 is coupled to the printed circuit board 4 by connector connection.

Good contact may be maintained between the heat sink fin 20 and the electronic module 10 when the electronic module 10 is coupled to the printed circuit board 4 by connector connection. Heat generated by the electronic module 10 in operation may be efficiently dissipated by the heat sink fin 20, and accordingly, heat dissipation efficiency may be improved.

The heat sink fin 20 is moved by insertion or removal of the electronic module 10. Thus, manual operations other than an mounting operation of the electronic module 10 may not be performed. The heat sink fin 20 may be automatically pressed against the electronic module 10 in a reliable manner.

When a surface of the electronic module 10 is inclined, since the spring units 32, which are sufficiently movable, press the heat sink fin 20 against the electronic module 10, the heat sink fin 20 may be pressed against the surface of the electronic module 10 while the heat sink fin 20 and the electronic module 10 are parallel to each other.

Figure 8:
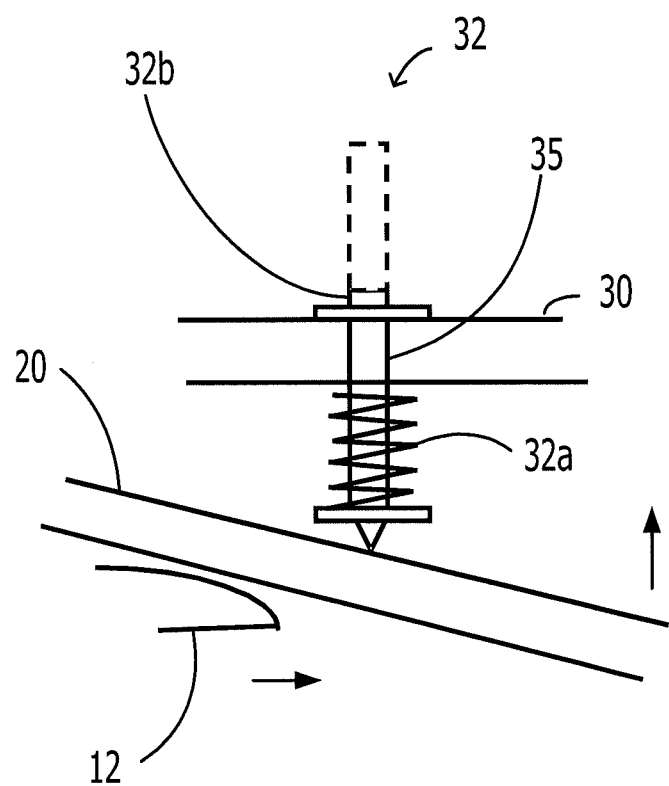
FIG. 8 illustrates an exemplary spring unit.
Figure 9:
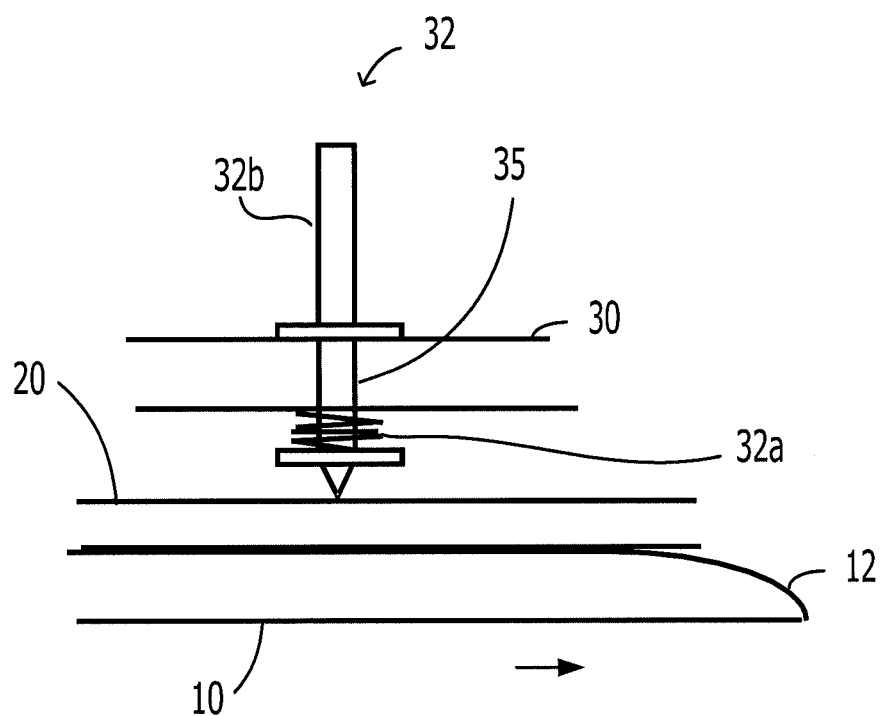
FIG. 9 illustrates an exemplary spring unit.

A heat sink sheet may be provided in a portion of the heat sink fin 20 contacting the electronic module 10. This may increase a heat dissipation effect. FIGS. 8 and 9 illustrate an exemplary spring unit. The spring unit illustrated in FIGS. 8 and 9 may be the spring unit 32 illustrated in FIG. 1 or 2. The spring unit 32 includes a spring 32a and a spring support bar 32b. The spring support bar 32b is engaged with a hole 35 formed in the spring support unit 30 to be attached to the spring support unit 30. The spring 32a is attached to a lower end of the spring support bar 32b. The spring support bar 32b is moved up and down owing to the spring pressure of the spring 32a, thereby moving the heat sink fin 20.

When the electronic module 10 is not inserted, the spring support bar 32b protrudes downward owing to the pressure of the spring 32a. When the electronic module 10 is inserted, the heat sink fin 20 is pressed upward by the connector protection cover 12 and the spring 32a to contract and the spring support bar 32b moves up.

When the electronic module 10 is coupled to the printed circuit board 4 by connector connection, the heat sink fin 20 enters the horizontal position. Owing to the spring pressure of the spring 32a, the heat sink fin 20 is pressed downward. Thus, the degree of contact between the electronic module 10 and the heat sink fin 20 is increased, thereby maintaining good contact between the electronic module 10 and the heat sink fin 20. Heat generated from the electronic module 10 during operation may be effectively dissipated.

Figure 10:
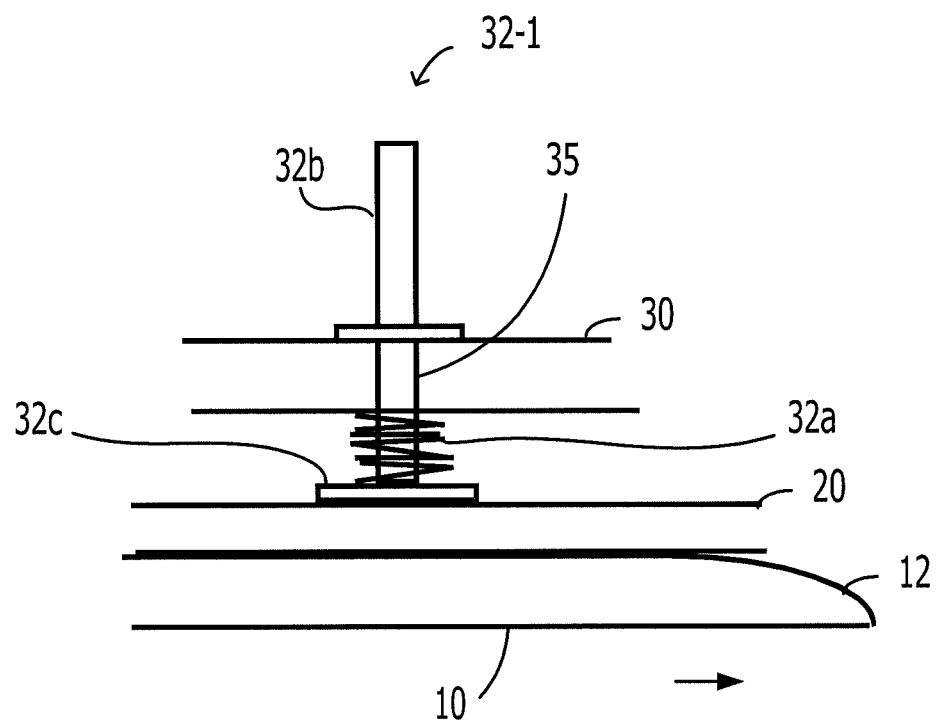
FIG. 10 illustrates an exemplary spring unit.

FIG. 10 illustrates an exemplary spring unit. The spring unit illustrated in FIG. 10 may be the spring unit 32 illustrated in FIG. 1 or 2. The spring unit 32-1 includes the spring 32a, the spring support bar 32b, and a stop 32c. The spring support bar 32b is engaged with the hole 35 formed in the spring support unit 30 to be attached to the spring support unit 30. The spring 32a is attached to the lower end of the spring support bar 32b.

The stop 32c, for example, a stop having a concentric shape may be provided in a portion of the spring support bar 32b contacting the heat sink fin 20. When the stop 32c is provided, an area in which the spring support bar 32b and the heat sink fin 20 contact each other may increase, thereby increasing the degree of contact between the spring support bar 32b and the heat sink fin 20. The pressure of the spring 32a may be spread over a surface of the heat sink fin 20.

Figure 11:
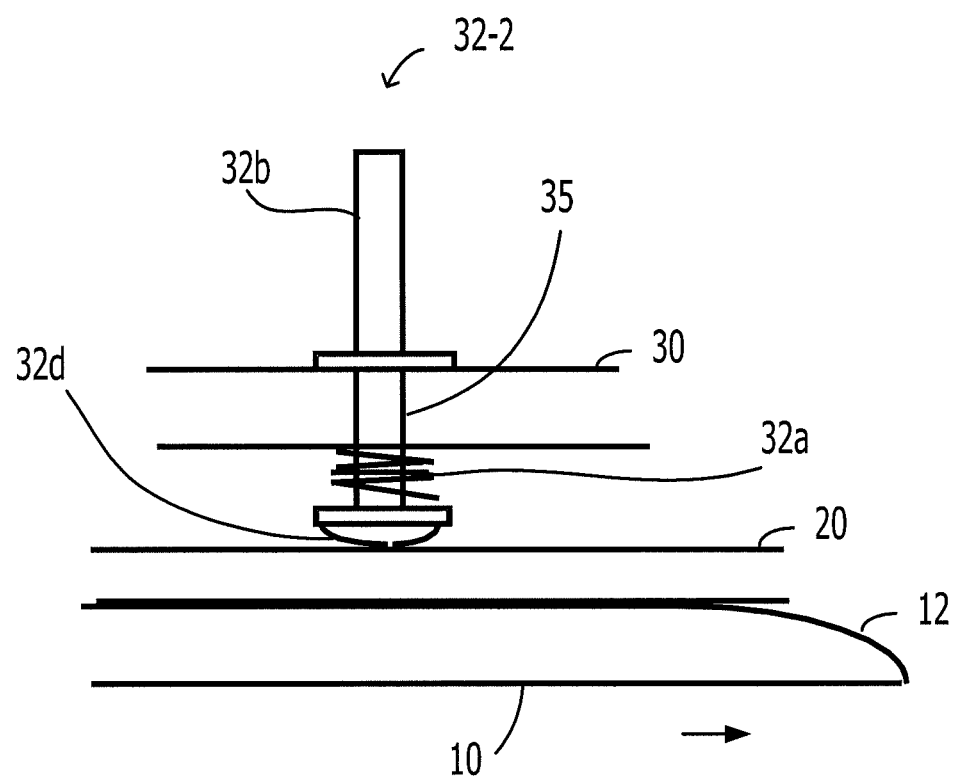
FIG. 11 illustrates an exemplary spring unit.

FIG. 11 illustrates an exemplary spring unit. The spring unit illustrated in FIG. 11 may be the spring unit 32 illustrated in FIG. 1 or 2. The spring unit 32-2 includes the spring 32a, the spring support bar 32b, and a curved tip portion (contact member) 32d. The spring support bar 32b is engaged with the hole 35 formed in the spring support unit 30 to be attached to the spring support unit 30. The spring 32a is attached to the lower end of the spring support bar 32b. The curved tip portion 32d may be provided in a portion of the spring support bar 32b contacting the heat sink fin 20.

With the curved tip portion 32d having a curved shape being provided in a portion of the spring support bar 32b contacting the heat sink fin 20, the spring unit 32-2 may smoothly move in accordance with the movement of the heat sink fin 20.

Figure 12:
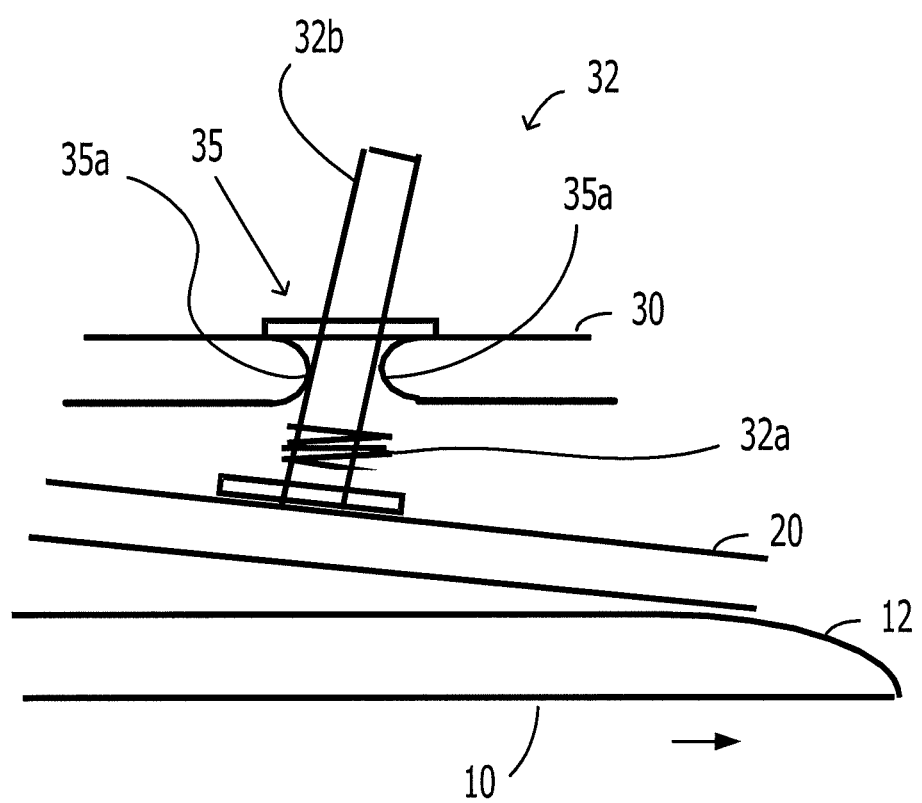
FIG. 12 illustrates an exemplary hole of a spring support unit.

FIG. 12 illustrates an exemplary hole of a spring support unit. The hole illustrated in FIG. 12 may be the hole 35 formed in the spring support unit 30 illustrated in FIG. 1 or 2, to which the spring unit 32 is attached. FIG. 12 may illustrate the shape of the hole 35 with which the spring unit is engaged. The hole has a curved shape, of which a side surface 35a of the hole 35 formed in the spring support unit 30 has a curvature. The spring support bar 32b passes through the hole 35.

The spring unit 32 may be maintained in a direction perpendicular to the surface of the heat sink fin 20 in accordance with the movement of the heat sink fin 20. This may increase the degree of contact between the heat sink fin 20 and the electronic module 10.

In the pluggable module 1, since good contact is maintained between the electronic module 10, which operates at high speed and generates a large amount of heat, and the heat sink fin 20, heat dissipation efficiency may be improved.

When the electronic module 10 is inserted, the electronic module 10 automatically contacts the heat sink fin 20. An operation to dissipate heat may not be performed on the pluggable module 1 on the printed circuit board 4.

The electronic module 10 is inserted or removed while a curved surface of the connector protection cover 12 smoothly contacts the heat sink fin 20. Thus, a friction or a degradation of portions where the electronic module 10 and the heat sink fin 20 contact each other may be decreased, and accordingly, the durabilities of the electronic module 10 and the heat sink fin 20 may be improved.

With respect to the commonality and compatibility of optical components, electrical and mechanical specifications of pluggable modules are standardized in accordance with the Multi-Source Agreement (MSA: an agreement on cross-vendor and cross-user for standardizing specifications of products such as package sizes and pin assignments). Accordingly, heat dissipation using a special structure for a specific device may not be applied.

With the pluggable module 1 illustrated in FIG. 1 or 2, heat dissipation effects may be obtained when the general-purpose MSA-compliant electronic module 10 is inserted. In the above-described pluggable module 1, the heat sink fin 20 moves in a flexible manner with regard to the inserted electronic module 10. Therefore, good contact may be maintained between the electronic module 10 and the heat sink fin 20, and accordingly, heat dissipation efficiency may be improved.

The structures of the spring unit 32 and the bearing unit 33 may absorb dimensional errors. The degree of contact between the electronic module based on standards and the heat sink fin 20 may be increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A pluggable module, comprising:
   an insertion gate through which an electronic module is inserted and removed;
   a guide rail, including a spring support unit provided with a spring unit and a bearing unit located near the insertion gate, to guide the electronic module; and
   a heat sink plate including, at one end portion, a fulcrum bar to be inserted into the bearing unit so as to move in a pressing direction of the spring unit, the heat sink plate being pushed up at the other end portion by a leading end of the electronic module so as to be pressed against the electronic module,
   wherein the bearing unit has an elliptical shape, receives the fulcrum bar and includes a spring in a major axis direction of the elliptical shape.

2. The pluggable module according to claim 1,
   wherein the heat sink plate is inclined from the one end portion to the other end portion thereof.

3. The pluggable module according to claim 1, wherein the spring unit includes a spring, and a spring support bar to move by a spring pressure.

4. The pluggable module according to claim 1,
   wherein the fulcrum bar disposed on the major axis is moved in an up and down direction by the spring.

5. A pluggable module, comprising:
   an insertion gate through which an electronic module is inserted and removed;
   a guide rail, including a spring support unit provided with a spring unit and a bearing unit located near the insertion gate, to guide the electronic module; and
   a heat sink plate including, at one end portion, a fulcrum bar to be inserted into the bearing unit so as to move in a pressing direction of the spring unit, the heat sink plate being pushed up at the other end portion by a leading end of the electronic module so as to be pressed against the electronic module,
   wherein the spring unit includes a spring, and a spring support bar to move by a spring pressure.

6. The pluggable module according to claim 5, further comprising,
   a stop provided between the spring support bar and the heat sink plate.

7. The pluggable module according to claim 5, further comprising,
   a contact portion member having a curvature provided between the spring support bar and the heat sink plate.

8. The pluggable module according to claim 5, further comprising,
   a hole having a curvature provided in the spring support unit, the spring support bar being engaged with the hole.

9. The pluggable module according to claim 1,
   wherein the electronic module has a protrusion portion having a curvature in the leading end portion.

10. A method of inserting an electronic module, the method comprising:
    inserting the electronic module into an insertion gate of a pluggable module;
    guiding the electronic module along a guide rail including a spring support unit with a spring unit and a bearing unit located near the insertion gate, the bearing unit having an elliptical shape and a spring in a major axis direction of the elliptical shape; and
    pushing up a heat sink plate by a leading end of the electronic module on the axis of a fulcrum bar to be inserted into the bearing unit so that the electronic module is pressed against the heat sink plate, the fulcrum bar moving in an up and down direction by the spring.

11. The method according to claim 10,
    wherein the electronic module is pressed against the heat sink plate such that the electronic module and the heat sink plate are parallel to each other.

12. The method according to claim 10, further comprising,
    pushing up the heat sink plate having an inclination with respect to the leading end of the electronic module so that the heat sink plate is pressed against the electronic module.

* * * * *